United States Patent
Thirukovalluru et al.

(10) Patent No.: US 9,881,614 B1
(45) Date of Patent: Jan. 30, 2018

(54) METHOD AND SYSTEM FOR REAL-TIME SUMMARY GENERATION OF CONVERSATION

(71) Applicant: XEROX CORPORATION, Norwalk, CT (US)

(72) Inventors: Raghuveer Thirukovalluru, Hyerabad (IN); Ragunathan Mariappan, Chennai (IN); Shourya Roy, Bangalore (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 0 days.

(21) Appl. No.: 15/205,047

(22) Filed: Jul. 8, 2016

(51) Int. Cl.
*G10L 15/26* (2006.01)
*G10L 21/10* (2013.01)
*G06F 17/30* (2006.01)

(52) U.S. Cl.
CPC ........ *G10L 15/26* (2013.01); *G06F 17/30616* (2013.01); *G10L 21/10* (2013.01)

(58) Field of Classification Search
CPC ............................ G10L 15/26; G06F 17/30616
See application file for complete search history.

(56) References Cited

U.S. PATENT DOCUMENTS

| | | | | |
|---|---|---|---|---|
| 6,289,304 B1* | 9/2001 | Grefenstette | ........... | G10L 13/00 704/9 |
| 8,396,719 B2 | 3/2013 | Patrick et al. | | |
| 8,447,285 B1* | 5/2013 | Bladon | ................... | G10L 15/26 370/300 |
| 8,531,501 B2* | 9/2013 | Portman | ............. | H04M 3/5133 348/14.02 |
| 8,600,034 B2* | 12/2013 | Teitelman | ................ | H04M 3/51 379/265.02 |
| 2010/0031142 A1* | 2/2010 | Nagatomo | .............. | G10L 15/26 715/254 |
| 2010/0274618 A1* | 10/2010 | Byrd | ...................... | G06Q 10/10 704/275 |
| 2010/0332287 A1 | 12/2010 | Gates et al. | | |

(Continued)

OTHER PUBLICATIONS

Kubala, Francis, et al. "Integrated technologies for indexing spoken language." Communications of the ACM 43.2 (2000): 48-56.*

(Continued)

*Primary Examiner* — Brian Albertalli
(74) *Attorney, Agent, or Firm* — Jones Robb PLLC

(57) ABSTRACT

The disclosed embodiments illustrate methods and systems for summary generation of a real-time conversation. The method includes receiving a real-time conversation from a plurality of computing devices over a communication network. The method further includes determining one or more first features of the real-time conversation between at least a first user and a second user. The method further includes extracting one or more second features from the one or more first features, based on one or more pre-defined criteria. The method further includes generating a summary content of the real-time conversation, based on at least the extracted one or more second features and one or more annotations associated with the determined one or more first features by use of one or more trained classifier. Further, the method includes rendering the generated summary content on a user interface displayed on at least one of the plurality of computing devices.

18 Claims, 7 Drawing Sheets

(56) References Cited

U.S. PATENT DOCUMENTS

| | | | | |
|---|---|---|---|---|
| 2011/0010173 | A1* | 1/2011 | Scott | H04M 3/42221 |
| | | | | 704/235 |
| 2012/0053937 | A1* | 3/2012 | Cao | G10L 15/26 |
| | | | | 704/235 |
| 2012/0179465 | A1* | 7/2012 | Cox | H04L 12/1822 |
| | | | | 704/235 |
| 2014/0140497 | A1* | 5/2014 | Ripa | H04M 3/5133 |
| | | | | 379/265.06 |
| 2015/0281447 | A1 | 10/2015 | Griesmer et al. | |
| 2015/0348538 | A1* | 12/2015 | Donaldson | G10L 15/08 |
| | | | | 704/235 |
| 2016/0019882 | A1* | 1/2016 | Matula | G10L 15/187 |
| | | | | 704/254 |
| 2016/0239805 | A1* | 8/2016 | Geffen | G06Q 10/10 |

OTHER PUBLICATIONS $QA^{RT}$ : A System for Real-Time Holistic Quality Assurance for Contact Center Dialogues, Shourya Roy, Ragunathan Mariappan, Sandipan Dandapat, Saurabh Srivastava, Sainyam Galhotra and Balaji Peddamuthu; Xerox Research Centre India, Bangalore, India; Proceedings of the Thirtieth AAAI conference on Artificial Intelligence (AAAI-16); pp. 3769-3775, Feb. 12, 2016.

\* cited by examiner

METHOD AND SYSTEM FOR REAL-TIME SUMMARY GENERATION OF CONVERSATION

TECHNICAL FIELD

The presently disclosed embodiments are related, in general, to a customer care environment. More particularly, the presently disclosed embodiments are related to methods and systems for real-time summary generation of a conversation between at least two users.

BACKGROUND

Past decade has witnessed various advancements in the field of customer service and support (CSS) for retaining and extending customer relationships once a product or service is sold. One of the various components of the CSS corresponds to customer care helpdesks whereby customer care helpdesk agents interact with the customers to address their queries, requests, and complaints related to the products and/or services, over various communication channels, such as phone, chats, social networks, and emails.

In certain scenarios, for a support session in which a customer care agent is conversing with a customer, a hand-off (i.e., a change of customer care agent) may happen for various reasons. Examples of such reasons may include, the customer care agent handling the support session unable to provide a satisfactory customer experience by not providing a proper solution, a supervisor of the customer care agent wanting to take-over the conversation, the customer asking for a different customer care agent whom he/she may have already interacted with, and/or the like.

In an exemplary hand-off situation, a chat between a first customer care agent and a customer may get disconnected abruptly, and a second customer care agent may reconnect to serve the customer. In one case, the second customer care agent may have to read the previous transcript of the conversation between the first customer care agent and the customer, before reconnecting with the customer. This may lead to a substantial waiting time for the customer. In another case, the customer may have to brief the conversation, which happened between the customer and the first customer care agent, to the second customer care agent. Again, such briefing may consume substantial time of the customer. Thus, a simplified and efficient summarization approach may be desirable for overcoming such problems faced by the customer and customer care agents, thereby eventually providing better customer experience.

Further, limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for summary generation of a real-time conversation. The method includes receiving, by one or more transceivers at a server, the real-time conversation from a plurality of computing devices over a communication network. The plurality of computing devices is associated with at least a first user and a second user. The method further includes determining, by one or more processors at the server, one or more first features of the real-time conversation between at least the first user and the second user based on at least one or more pre-defined part of speech (POS) patterns. The method further includes extracting, by the one or more processors, one or more second features from the one or more first features based on one or more pre-defined criteria. The method further includes generating, by the one or more processors, a summary content of the real-time conversation based on at least the extracted one or more second features and one or more annotations associated with the determined one or more first features, by use of one or more trained classifiers. The method further includes rendering, by one or more graphical processors, the generated summary content on a user interface displayed on at least one of the plurality of computing devices.

According to embodiments illustrated herein, there is provided a system for summary generation of a real-time conversation. The system includes one or more transceivers in a server configured to receive the real-time conversation from a plurality of computing devices over a communication network. The plurality of computing devices is associated with at least a first user and a second user. The system further includes one or more processors configured to determine one or more first features of the real-time conversation between at least the first user and the second user based on at least one or more pre-defined part of speech (POS) patterns. The one or more processors are further configured to extract one or more second features from the one or more first features based on one or more pre-defined criteria. The one or more processors are further configured to generate a summary content of the real-time conversation based on at least the extracted one or more second features and one or more annotations associated with the determined one or more first features, by use of one or more trained classifiers. The one or more processors are further configured to render the generated summary content on a user interface displayed on at least one of the plurality of computing devices.

According to embodiment illustrated herein, there is provided a computer program product for use with a computer. The computer program product includes a non-transitory computer readable medium. The non-transitory computer readable medium stores a computer program code for summary generation of a real-time conversation. The computer program code is executable by one or more processors in a server to receive the real-time conversation from a plurality of computing devices over a communication network. The plurality of computing devices is associated with at least a first user and a second user. The computer program code is further executable by the one or more processors to determine one or more first features of the real-time conversation between at least the first user and the second user based on at least one or more pre-defined POS patterns. The computer program code is further executable by the one or more processors to extract one or more second features from the one or more first features based on one or more pre-defined criteria. The computer program code is further executable by the one or more processors to generate a summary content of the real-time conversation based on at least the extracted one or more second features and one or more annotations associated with the determined one or more first features, by use of one or more trained classifiers. The computer program code is further executable by the one or more processors to render the generated summary content on a user interface displayed on at least one of the plurality of computing devices.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
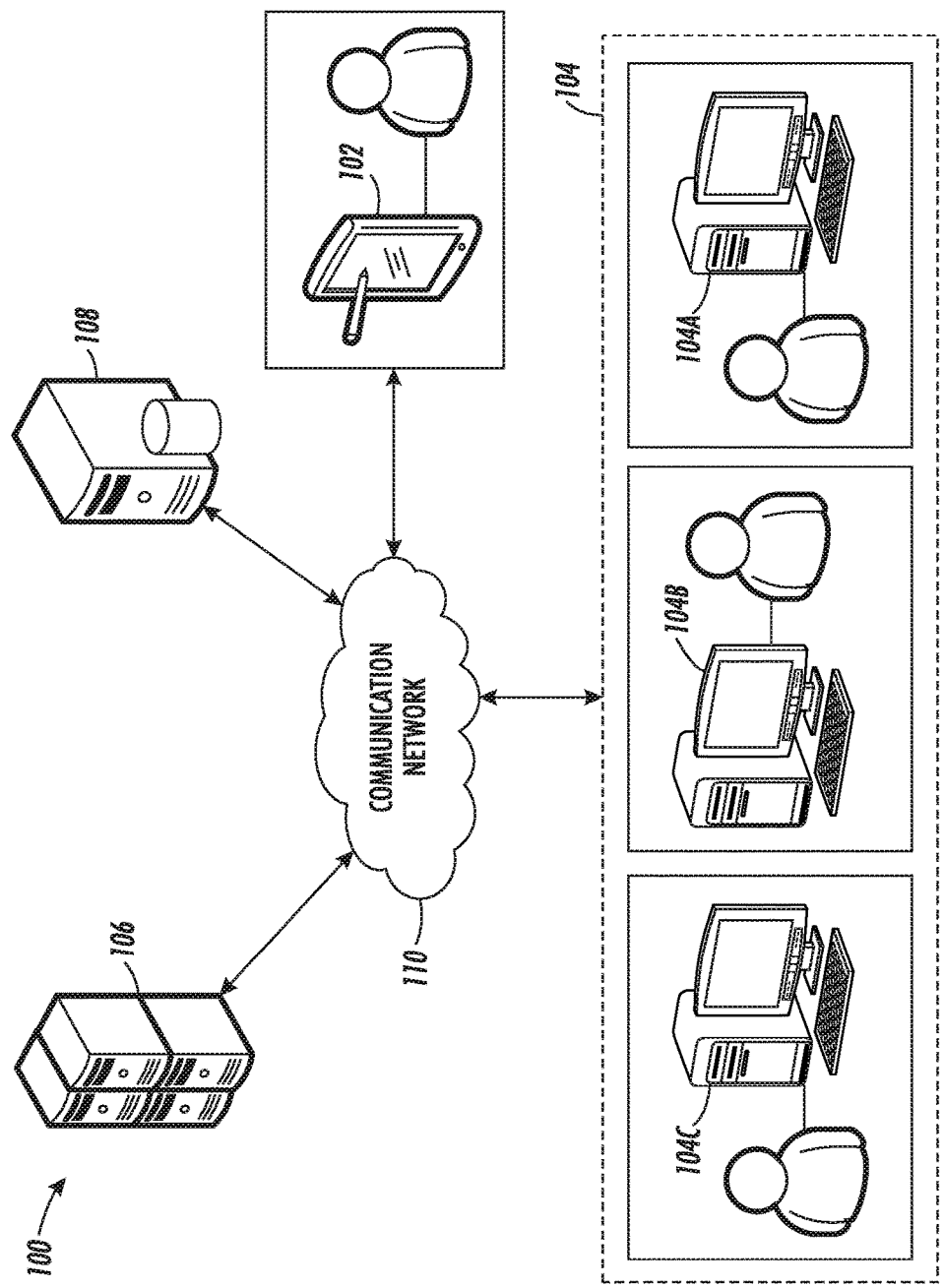
FIG. 1 is a block diagram of a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a computer, a device (that includes one or more processors/microcontrollers and/or any other electronic components), or a system (that performs one or more associated operations according to one or more sets of instructions, codes, programs, and/or the like). Examples of the computing device may include, but are not limited to, a desktop computer, a laptop, a personal digital assistant (PDA), a mobile device, a smartphone, a tablet computer (e.g., iPad® and Samsung Galaxy Tab®), and/or the like.

A "conversation" refers to a text-based communication between at least two individuals. In an embodiment, the at least two individuals may utilize their respective computing devices (e.g., mobile phones, a desktop, a laptop, and/or the like) to connect with each other, over a communication network. Post the establishment of the connection over the communication network, the at least two individuals may exchange text information with each other, over the communication network, by use of their respective computing devices. The exchanged text information may correspond to the conversation. In a scenario, when the exchanged information is in audio format, a text transcript of the audio information is generated. The text transcript may further correspond to the conversation. In an embodiment, a real-time conversation may correspond to a conversation between the at least two individuals at a current instant of time.

A "customer-computing device" refers to a computer, a device (that includes one or more processors/microcontrollers and/or any other electronic components), or a system (that performs one or more associated operations according to one or more sets of instructions, codes, programs, and/or the like). In an embodiment, an individual may utilize the customer-computing device to communicate with another individual over a communication network. Examples of the computing device may include, but are not limited to, a desktop, a laptop, a personal digital assistant (PDA), a mobile device, a smartphone, a tablet computer (e.g., iPad® and Samsung Galaxy Tab®), and/or the like.

An "agent-computing device" refers to a computer, a device (that includes one or more processors/microcontrollers and/or any other electronic components), or a system (that performs one or more associated operations according to one or more sets of instructions, codes, programs, and/or the like). In an embodiment, an agent may utilize the agent-computing device to communicate with another individual, over a communication network. The agent-computing device may be global positioning system (GPS) enabled and capable of accessing (or being accessed over) a communication network (e.g., using wired or wireless communication capabilities). Examples of the agent-computing device may include, but are not limited to, a desktop, a laptop, a personal digital assistant (PDA), a smartphone, or the like.

A "first user" refers to an individual who may have one or more queries, requests, or complaints pertaining to one or more products and/or services. In order to find one or more solutions to the one or more queries, requests, or complaints, the first user may utilize a computing device, such as a customer-computing device, to initiate communication with another individual, such as a customer care agent, over a communication network. Hereinafter, the "first user" and "customer" may be interchangeably used.

A "second user" refers to an individual who may communicate with one or more first users to provide one or more solutions pertaining to one or more queries, requests, or complaints. In an embodiment, the second user may correspond to a bot device that may be programmed to communicate with the one or more first users to provide the one or more solutions pertaining to the one or more queries, requests, or complaints. Hereinafter, "second user," "first customer care agent," and "first agent" may be interchangeably used.

A "third user" refers to an individual who may be responsible for monitoring one or more skills (e.g., problem solving skills, communication skills, behavioral skills, and/or the like) of one or more customer care agents, when the one or more customer care agents are in communication with one or more first users (i.e., one or more customers) over a communication network. Hereinafter, "third user," "second agent," "second customer care agent," "supervisor," "team lead," "manager," and "group manager" may be interchangeably used.

A "fourth user" refers to another customer care agent who may communicate with a first user, when a communication between the first user and a previous customer care agent may have been interrupted for one or more reasons. For example, the one or more reasons may correspond to one or more of: the previous customer care agent being unable to provide proper solution to the first user, a supervisor of the previous customer care agent wanting to take-over the conversation, the first user asking for a different customer care agent whom he/she may have already interacted with, and/or the like. Hereinafter, "fourth user," "third customer care agent," and "third agent" may be interchangeably used.

"Summary content" refers to information that is representative of a gist of a conversation between two individuals. The summary content may include at least an abstract section and an excerpt section. The abstract section may include information that is representative of at least one of: a current state of the conversation, a product/service of interest indicated in the conversation, a query associated with the product/service, and a solution pertaining to the query in the conversation. The excerpt section may include information (e.g., one or more key phrases) from the conversation that supports the information in the abstract section.

"One or more first features" refer to one or more phrases in a real-time conversation between a first user and a second user that may be utilized to generate summary content. In an embodiment, the one or more first features may be determined based on at least one or more pre-defined parts-of-speech (POS) patterns identified in the real-time conversation. The one or more pre-defined POS patterns may include one or more noun phrases, one or more verb phrases, and/or the like.

"One or more second features" refer to at least one of a set of words, a set of contextual information, and a set of conversational element in one or more first features. In an embodiment, the one or more second features may be determined based on at least one or more of: a length associated with a phrase extracted from a conversation based on a pre-defined POS pattern, a length of a turn containing the phrase, one or more time stamps in the conversation, and/or the like. In an embodiment, the turn may correspond to an uninterrupted conversational segment associated with an individual involved in the conversation.

"Annotations" refer to notes or comments provided by one or more individuals. For example, an annotation of a phrase may be representative of whether the phrase is representative of an ongoing conversation or not.

"Historical conversations" refer to previous conversations between one or more first users and one or more customer care agents. The historical conversations may be utilized to train one or more classifiers.

FIG. 1 is a block diagram of a system environment in which various embodiments may be implemented. With reference to FIG. 1, there is shown a system environment 100 that includes one or more customer-computing devices, such as a customer-computing device 102, one or more agent-computing devices 104, such as a first agent-computing device 104A, a second agent-computing device 104B, and a third agent-computing device 104C, one or more application servers, such as an application server 106, one or more database servers, such as a database server 108, and a communication network 110. The customer-computing device 102, the one or more agent-computing devices 104, the application server 106, and the database server 108 are communicatively coupled with each other, via the communication network 110.

The customer-computing device 102 refers to a computing device used by a customer. The customer corresponds to a first user who may wish to determine one or more solutions pertaining to one or more queries, requests, or complaints associated with one or more products and/or services. The customer-computing device 102 may include one or more processors in communication with one or more memories. The one or more memories may include one or more sets of computer readable codes, instructions, programs, and/or the like that are executable by the one or more processors to perform one or more operations, based on one or more input values provided by the customer. In an embodiment, the customer may utilize the customer-computing device 102 to connect with the one or more agent-computing devices 104, such as the first agent-computing device 104A, the second agent-computing device 104B, and the third agent-computing device 104C, over the communication network 110. Based on at least the connection over the communication network 110, the customer may initiate one or more conversations with one or more agents (such as one or more customer care agents). The one or more conversations may include one or more concerns of the customer, such as the one or more queries, requests, or complaints associated with the one or more products and/or services. The one or more conversations may further include one or more solutions or responses pertaining to the one or more queries, requests, or complaints provided by the one or more customer care agents. Examples of the customer-computing device 102 may include, but are not limited to, a personal computer, a laptop, a personal digital assistant (PDA), a mobile device, a tablet, or other such computing devices.

The one or more agent-computing devices 104 refer to one or more computing devices that may be utilized by the one or more customer care agents to communicate with one or more customers, over the communication network 110. Each of the one or more agent-computing devices 104 may include one or more processors in communication with one or more memories. The one or more memories may include one or more sets of computer readable codes, instructions, programs, and/or the like that are executable by the one or more processors to perform one or more operations, based on one or more inputs provided by the one or more customer care agents.

For simplicity of the forthcoming discussion, the system environment 100 has been explained with three agent-computing devices, such as the first agent-computing device 104A, the second agent-computing device 104B, and the third agent-computing device 104C. However, a person having ordinary skills in the art will understand that the scope of the disclosure is not limited to the three agent-computing devices. The disclosed method and the system may be realized by using more than three agent-computing devices, without deviating from the scope of the disclosure.

The first agent-computing device 104A may be associated with a first agent, such as a first customer care agent, the second agent-computing device 104B may associated with a second agent, such as a second customer care agent, and the third agent-computing device 104C may be associated with a third agent, such as a third customer care agent). The one or more agents, such as the first customer care agent, the second customer care agent, and the third customer care agent may interact and/or operate with corresponding agent-computing devices by using various input/output mediums, such as, but not limited to, a keypad, mouse, joystick, touch-sensitive medium (e.g., a touch-screen or touch sensitive pad), voice recognition, gestures, and video recognition.

A person having ordinary skills in the art will understand that the operation of the first agent-computing device 104A, the second agent-computing device 104B, and the third agent-computing device 104C may not be limited from a particular location. In an embodiment, the first agent, the second agent, and the third agent may utilize their corresponding agent-computing devices 104, such as the first agent-computing device 104A, the second agent-computing device 104B, and the third agent-computing device 104C, respectively, to respond to the one or more queries, requests, or complaints of the one or more customers from different locations, without limiting the scope of the disclosure.

In an embodiment, a customer care agent or a programmed bot device, such as the first agent, may utilize the first agent-computing device 104A to connect with the customer-computing device 102 associated with the customer, over the communication network 110. Based on the established connection, in an embodiment, the customer may initiate a conversation with the first agent. In another embodiment, the first agent may initiate the conversation with the customer. The conversation between the first agent and the customer may be in a text format. In a scenario, when the customer and the first agent communicates with each other over a telephonic call, a web-based call, or an app-based call, a text transcript of the call may be generated by use of one or more automatic speech recognition (ASR) techniques known in the art. In such a scenario, the generated text transcript may correspond to the conversation. Further, in an embodiment, a customer care agent, such as the second agent may utilize the second agent-computing device 104B to monitor the conversation between the first agent (or the third agent) and the customer over the communication network 110. In an embodiment, the second agent may utilize a summary of the conversation, such as summary content generated in real-time, to monitor the problem solving skills of the first agent (or the third agent). Further, the second agent may utilize the second agent-computing device 104B to assist the first agent (or the third agent), with respect to the one or more queries, requests, or complaints of the customer, during the conversation based on at least the monitoring. The role of each of the first agent, the second agent, and the third agent has been explained in detail in conjunction with FIG. 3.

Examples of the one or more agent-computing devices 104, may include, but are not limited to, personal computers, laptops, personal digital assistants (PDAs), mobile devices, tablets, or other such computing devices.

The application server 106 refers to a computing device or a software framework hosting an application or a software service. In an embodiment, the application server 106 may be implemented to execute procedures, such as, but not limited to, the one or more sets of programs, instructions, codes, routines, or scripts stored in one or more memories for supporting the hosted application or the software service. In an embodiment, the hosted application or the software service may be configured to perform one or more operations. For example, the one or more operations of the application server 106 may correspond to establishing a connection between the customer and an agent, such as the first customer care agent or the third customer care agent, over the communication network 110. The one or more operations of the application server 106 may further correspond to receiving a real-time conversation between the customer and the customer care agent based on at least the established connection. The one or more operations of the application server 106 may further correspond to determining one or more first features of the real-time conversation based on one or more pre-defined POS patterns. The one or more operations of the application server 106 may further correspond to extracting one or more second features from the one or more first features based on one or more pre-defined criteria. Thereafter, the application server 106 may be operable to generate the summary content of the real-time conversation, based on at least the extracted one or more second features. The generation of the summary content from the real-time conversation has been explained in detail in conjunction with FIG. 3.

Further, in an embodiment, the application server 106 may render the generated summary content on a user interface displayed on a display screen of the one or more agent-computing devices, such as the second agent-computing device 104B. The second agent (such as a supervisor), associated with the second agent-computing device 104B, may utilize the generated summary content to monitor the performance of the one or more customer care agents, such as the first agent and/or the third agent, during or after the conversation with the customer. Further, in an embodiment, when a hand-off occurs between the customer and the first agent, the application server 106 may be configured to render the generated summary content on the user interface displayed on the display screen of the one or more agent-computing devices 104. Further, in an embodiment, the application server 106 may be configured to train one or more classifiers, based on one or more historical conversations between one or more agents and one or more customers. Prior to the training of the one or more classifiers, the application server 106 may be configured to extract the one or more historical conversations from the database server 108. Further, the application server 106 may be configured to perform segmentation of the one or more historical conversations in case a higher granularity in the generation of the summary content is required. The segmentation may be performed based on a request that corresponds to triggering of the generation of the summary content at every segment in a conversation. Otherwise, if not specifically requested, the generation of the summary content may be triggered at every turn in the real-time conversation. The application server 106 is realized through various types of application servers, such as, but not limited to, a Java application server, a .NET framework application server, a Base4 application server, a PHP framework application server, or other such application server framework.

A person having ordinary skill in the art will appreciate that the scope of the disclosure is not limited to realizing the application server 106 and each of the one or more agent-computing devices 104, as separate entities. In an embodiment, the application server 106 may be realized as an application program installed on and/or running on each of the one or more agent-computing devices 104, without departing from the scope of the disclosure.

The database server 108 refers to a computing device or a storage device that may be configured to perform one or more database operations. The one or more database operations may include one or more of, but not limited to, receiving, storing, processing, and transmitting one or more queries, data, or content to/from one or more computing devices. For example, the database server 108 may be configured to store the one or more historical conversations between the one or more customers, and the one or more customer care agents. Further, the database server 108 may be configured to store one or more ongoing conversations, such as one or more real-time conversations, between the customer and the one or more customer care agents. The database server 108 may be further configured to store the summary content pertaining to the one or more real-time conversations.

In addition to the summary content, the database server 108 may be configured to store the one or more queries, requests, or complaints, associated with each of the one or more conversations (i.e., historical and real-time) between the one or more customers and the one or more customer care agents. Further, the database server 108 may be configured to store the one or more responses, pertaining to the one or more queries, requests, or complaints, provided by the one or more customer care agents to the one or more customers during the one or more conversations.

Further, in an embodiment, the database server 108 may be configured to store the one or more sets of instructions, codes, scripts, or programs that may be retrieved by the application server 106 to perform the one or more operations. For querying the database server 108, one or more querying languages may be utilized, such as, but not limited to, SQL, QUEL, and DMX. In an embodiment, the database server 108 may be realized through various technologies such as, but not limited to, Microsoft® SQL Server, Oracle®, IBM DB2®, Microsoft Access®, PostgreSQL®, MySQL® and SQLite®.

A person with ordinary skill in the art will understand that the scope of the disclosure is not limited to the database server 108 as a separate entity. In an embodiment, the functionalities of the database server 108 may be integrated into the application server 106, or vice-versa, without deviating from the scope of the disclosure.

The communication network 110 corresponds to a communication medium through which the customer-computing device 102, the first agent-computing device 104A, the second agent-computing device 104B, the third agent-computing device 104C, the application server 106, and the database server 108 may communicate with each other. Such communication is performed, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Light Fidelity (Li-Fi), ZigBee, EDGE, infrared (IR), IEEE 802.11, 802.16, 2G, 3G, 4G cellular communication protocols, and/or Bluetooth (BT) communication protocols. The communication network 110 includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
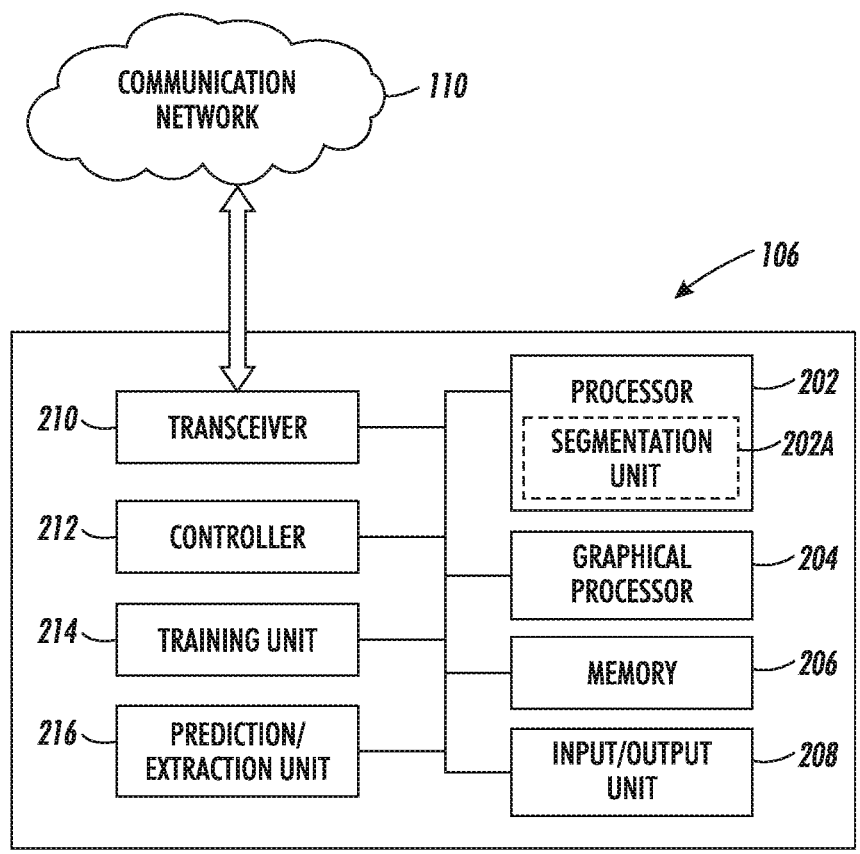
FIG. 2 is a block diagram that illustrates a system for summary generation of a real-time conversation, in accordance with at least one embodiment.

FIG. 2 is a block diagram that illustrates a system configured to generate a summary of a real-time conversation, in accordance with at least one embodiment. With reference to FIG. 2, the system has been referred to as the application server 106 that has been explained in conjunction with the elements from FIG. 1. In an embodiment, the application server 106 includes one or more processors, such as a processor 202, one or more graphical processors, such as a graphical processor 204, one or more memories, such as a memory 206, one or more input/output (I/O) units, such as an I/O unit 208, one or more transceivers, such as transceiver 210, one or more controllers, such as a controller 212, one or more training units, such as a training unit 214, and one or more prediction/extraction units, such as a prediction/extraction unit 216.

The processor 202 may comprise one or more suitable logics, circuitries, interfaces, and/or codes that may be configured to execute one or more set of instructions, programs, or algorithms stored in the memory 206 to perform the one or more operations. For example, the processor 202 may be configured to determine the one or more first features from the real-time conversation that occurs between the customer and the customer care agent. Thereafter, the processor 202 may extract the one or more second features from the one or more first features. Thereafter, based on at least the one or more second features and one or more annotations associated with the one or more first features, the processor 202 may generate the summary content of the real-time conversation. The processor 202 may further include a segmentation unit 202a. The segmentation unit 202a may be configured to perform segmentation of the one or more historical conversations in case the higher granularity in the generation of the summary content is required. The segmentation may be performed by the segmentation unit 202a based on the request that corresponds to triggering of the generation of the summary content at every segment in a conversation. Otherwise, if not specifically requested, the generation of the summary content may be triggered at every turn in the real-time conversation. The processor 202 may be communicatively coupled to the graphical processor 204, the memory 206, the I/O unit 208, the transceiver 210, and the controller 212. The processor 202 may be implemented based on a number of processor technologies known in the art. Examples of the processor 202 may include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The graphical processor 204 may comprise one or more suitable logics, circuitries, interfaces, and/or codes that may be configured to perform one or more operations. For example, the graphical processor 204 may be configured to generate a user interface that corresponds to the generated summary content. The generated user interface may be rendered on a display screen of the one or more agent-computing devices 104, such as the second agent-computing device 104B. The graphical processor 204 may be communicatively coupled to the processor 202, the memory 206, the I/O unit 208, the transceiver 210, and the controller 212. The graphical processor 204 may be implemented based on a number of processor technologies known in the art. Examples of the graphical processor 204 may include, but not limited to, an X86-based processor, a RISC processor, an ASIC processor, a CISC processor, an ATI graphics processor, an Nvidia® graphics processor, an AMD Accelerated Processing Unit, an Intel HD graphics processor, and/or other processors.

The memory 206 may comprise one or more suitable logics, circuitries, interfaces, and/or codes that may be configured to store the one or more sets of instructions, programs, or algorithms, which are executed by the processor 202 to perform the one or more operations. In an embodiment, the memory 206 may be configured to store one or more programs, routines, or scripts that may be executed in coordination with the processor 202 and/or the graphical processor 204. The memory 206 may be implemented based on a Random Access Memory (RAM), a Read-Only Memory (ROM), a Hard Disk Drive (HDD), a storage server, and/or a Secure Digital (SD) card. It will be apparent to a person having ordinary skill in the art that the one or more sets of instructions, codes, scripts, and programs stored in the memory 206 may enable the hardware of the system (such as the application server 106) to perform the one or more predetermined operations.

The I/O unit 208 may comprise one or more suitable logics, circuitries, interfaces, and/or codes that may be operable to receive one or more requests or queries from the customer-computing device 102 and the one or more agent-computing devices 104. Further, the I/O unit 208, in conjunction with the transceiver 210, may be configured to transmit one or more responses pertaining to the one or more requests or queries to the customer-computing device 102, the one or more agent-computing devices 104, and/or the database server 108, via the communication network 110. The I/O unit 208 may be operable to communicate with the processor 202, the graphical processor 204, the memory 206, the transceiver 210, and the controller 212. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

The transceiver 210 may comprise one or more suitable logics, circuitries, interfaces, and/or codes that may be configured to receive or transmit one or more queries, data, content, or other information to/from one or more computing devices (e.g., the customer-computing device 102 and the one or more agent-computing devices 104) or one or more servers, such as the database server 108 over the communication network 110. The transceiver 210 may implement one or more known technologies to support wired or wireless communication with the communication network 110. In an embodiment, the transceiver 210 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use one or more of a plurality of communication standards, protocols and technologies, such as: Global System for Mobile Communications (GSM), Enhanced Data for GSM Evolution (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The controller 212 may comprise one or more suitable logics, circuitries, interfaces, and/or codes that may be configured to control provisioning of the one or more operations associated with the processor 202 and the graphical processor 204. The controller 212 may be communicatively coupled to the processor 202, the graphical processor 204, the memory 206, the I/O unit 208, and the transceiver 210. The controller 212 may be a plug in board, a single integrated circuit on the motherboard, or an external device. Examples of the controller may include, but are not limited to, graphics controller, small computer system interface (SCSI) controller, network interface controller, memory controller, programmable interrupt controller, and terminal access controller.

The training unit 214 may comprise one or more suitable logics, circuitries, interfaces, and/or codes that may be configured to perform one or more operations. For example, the training unit 214 may be configured to train the one or more classifiers and/or predictors, based on the one or more historical conversations between the one or more customers and the one or more customer care agents. The training unit 214 may be communicatively coupled to the processor 202, the graphical processor 204, the memory 206, the I/O unit 208, the transceiver 210, the controller 212, and the prediction/extraction unit 216. The training unit 214 may be implemented based on a number of processor technologies known in the art. Examples of the training unit 214 may include, but not limited to, an X86-based processor, a RISC processor, an ASIC processor, and a CISC processor.

The prediction/extraction unit 216 may comprise one or more suitable logics, circuitries, interfaces, and/or codes that may be configured to perform one or more operations. For example, the prediction/extraction unit 216 may be configured to predict summary phrases, a problem type, and a resolution type, to be included in the summary content, associated with the real-time conversation by utilizing the one or more trained classifiers. The prediction/extraction unit 216 may be communicatively coupled to the processor 202, the graphical processor 204, the memory 206, the I/O unit 208, the transceiver 210, the controller 212, and the training unit 214. The prediction/extraction unit 216 may be implemented based on a number of processor technologies known in the art. Examples of the prediction/extraction unit 216 may include, but not limited to, an X86-based processor, a RISC processor, an ASIC processor, and a CISC processor.

Figure 3:
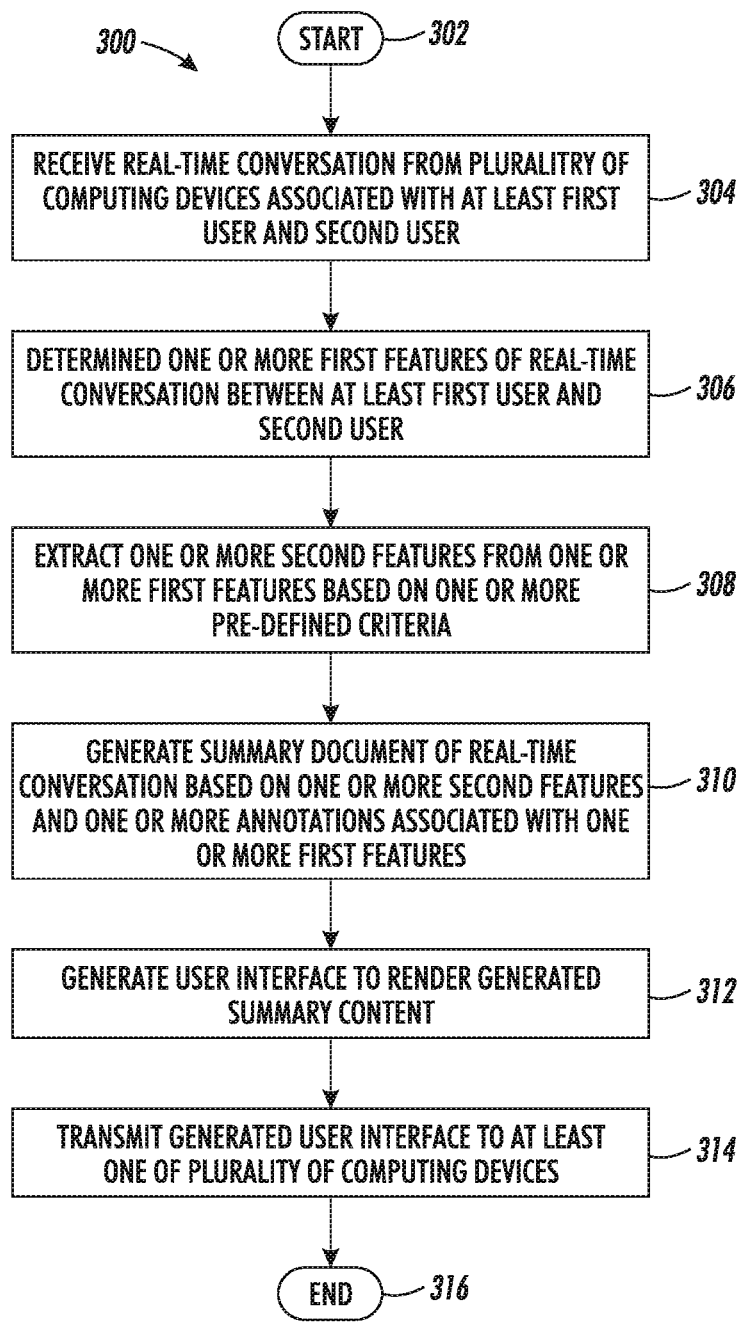
FIG. 3 is a flowchart that illustrates a method for summary generation of a real-time conversation, in accordance with at least one embodiment.

FIG. 3 is a flowchart that illustrates a method for summary generation of a real-time conversation, in accordance with at least one embodiment. With reference to FIG. 1, there is shown a flowchart 300 described in conjunction with elements from FIG. 1 and FIG. 2. The method starts at step 302 and proceeds to step 304.

At step 304, the real-time conversation is received from a plurality of computing devices associated with at least the customer, i.e. the first user, and the first agent, i.e. the second user. In an embodiment, the processor 202, in conjunction with the transceiver 210 and the controller 212, may be configured to receive the real-time conversation from the plurality of computing devices associated with at least the customer and the first agent, via the communication network 110. The real-time conversation may correspond to an ongoing communication (in current time) between the customer and the first agent. Further, the plurality of computing devices may include at least one customer-computing device, such as the customer-computing device 102 associated with the customer, and at least one agent-computing device, such as the first agent-computing device 104A associated with the first agent.

Before receiving the real-time conversation, in an embodiment, the processor 202 may receive a request from the customer-computing device 102, associated with the customer (i.e., the first user), to connect with the first agent-computing device 104A, associated with the first agent (i.e., the second user). In another embodiment, the processor 202 may receive another request from the first agent-computing device 104A, associated with the first agent to connect with the customer-computing device 102, associated with the customer. In an embodiment, the customer may utilize the customer-computing device 102 to initiate the request for the communication with the first agent, over the communication network 110, and vice-versa. After the connection is established between the customer-computing device 102 and the first agent-computing device 104A over the communication network 110, the real-time conversation may be initiated between the customer and the first agent. The real-time conversation may include the one or more problems, such as queries, requests, and/or complaints, associated with the one or more products and/or services, enquired by the customer. The real-time conversation may further include the one or more problem resolutions and/or recommendations, associated with the one or more products and/or services, provided by the first agent. The processor 202 may be configured to receive the real-time conversation occurring between the customer and the first agent. Further, the processor 202 may store the real-time conversation in a storage device, such as the memory 206 and/or the database server 108.

At step 306, the one or more first features of the real-time conversation between at least the customer, i.e. the first user, and the first agent, i.e. the second user, are determined. In an embodiment, the processor 202 may be configured to determine the one or more first features of the real-time conversation between the customer and the first agent. The one or more first features may correspond to one or more key phrases in the real-time conversation. The one or more key phrases may be indicative of at least the one or more queries, requests, complaints, recommendations, responses, solutions, and/or the like, associated with the one or more products and/or services.

In an embodiment, the processor 202 may be configured to determine the one or more first features based on at least the one or more pre-defined POS patterns. The one or more pre-defined POS patterns may be utilized to determine the one or more key phrases in the real-time conversation between the customer and the first agent. In an embodiment, the one or more pre-defined POS patterns may be based on at least one or more noun phrases, one or more verb phrases, or other important phrases in the real-time conversation. For example, the processor 202 may utilize one or more pre-defined syntaxes, as shown in Table-1, to identify the one or more pre-defined POS patterns in the real-time conversation.

TABLE 1

List of POS patterns (i.e., pre-defined syntaxes)

| | |
|---|---|
| NP: {<JJ\|NN.*>*<IN>?<JJ\|NN.*>*<NN.*>} | IP: {<NP><TO>+} |
| VP: {<VB.*><IN>*<DT><NP>*} | IP: {<TO>+<VP\|VB.*>} |
| IP: {<NN.*\|PR.*>+<VB.*>} | IP: {<VP><IN>*} |
| IP: {<VB.*><NN.*\|PR.*>+} | IP: {<IP><IP>} |
| IP: {<VBZ><VB.*>} | IP: {<IP><NP>} |
| IP: {<NP><RB>*<IP\|VP\|VB.*>} | IP: {<NP><IP>} |
| IP: {<JJ.><IN>*<DT>*<NP>} | IP: {<VP><IP>} |
| IP: {<CD><NP\|NN.*>} | IP: {<IP><VP>} |
| IP: {<IP><VB.*>} | IP: {<IP><PR.*><IP>} |

NP corresponds to noun Phrases in a conversation;
VP corresponds to Verb Phrases in a conversation;
IP corresponds to important phrases in a conversation;
JJ corresponds to an adjective in a conversation;
NN corresponds to a noun, singular or mass in a conversation;
VB corresponds to a verb, base form in a conversation;
DT corresponds to a determiner in a conversation;
VBZ corresponds to a verb, third person singular present in a conversation; and
CD corresponds to a cardinal number in a conversation.

A person having ordinary skills in the art will understand that the scope of the disclosure for the determination of the one or more pre-defined POS patterns is not limited to be based on the one or more pre-defined syntaxes, as shown in the Table-1. Table-1 illustrates the one or more pre-defined syntaxes that are only for illustrative purpose and should not be taken as a limiting factor for the determination of the one or more pre-defined POS patterns. In an embodiment, the processor 202 may utilize other syntaxes, known in the art, to determine the one or more pre-defined POS patterns, without limiting the scope of the disclosure.

After determining the one or more first features, the processor 202, in conjunction with the transceiver 210, may transmit the one or more first features for annotations. In an embodiment, the annotations for the one or more first features may be obtained by crowdsourcing the one or more first features on a crowdsourcing platform. In another scenario, the processor 202 may transmit the one or more first features to another agent-computing device, associated with an agent who may be an expert or authorized to annotate the one or more first features. In an embodiment, the annotation of the one or more first features may correspond to marking of the one or more first features with either "0" or "1." The one or more first features that correspond to summary phrases are annotated as "1" and the one or more first features that correspond to non-summary phrases are annotated as "0" by crowd-sources and/or the agent, expert or authorized to annotate the one or more first features. Thereafter, the processor 202 may receive the annotated one or more first features from the crowd-sources and/or the agent, expert or authorized to annotate the one or more first features. The processor 202 may be further configured to store the one or more first features of the real-time conversation and the corresponding annotations in the storage device, such as the memory 206 and/or in the database server 108.

At step 308, the one or more second features are extracted from the one or more first features based on the one or more pre-defined criteria. In an embodiment, the processor 202 may be configured to extract the one or more second features from the one or more first features based on the one or more pre-defined criteria. In an embodiment, the one or more second features comprise at least one of a set of words, a set of contextual information, and a set of conversational element that are extracted from the one or more first features based on the one or more pre-defined criteria. In an embodiment, the one or more pre-defined criteria are based on at least one or more of: a length associated with a phrase extracted from the real-time conversation based on a pre-defined POS pattern, a length of a turn containing the phrase, one or more time stamps in the real-time conversation, and/or the like.

For example, the processor 202 may utilize the one or more pre-defined criteria, as shown in Table-2, to extract the one or more second features from the one or more first features of the real-time conversation.

TABLE 2

List of second features and corresponding criteria

| Second Features | Pre-defined criteria | |
|---|---|---|
| Set of words | 1. With/Without stemming | |
| Set of contextual Information | 2. LOP | Length of the phrase extracted by the POS pattern |
| | 3. LOT | Length of the turn containing the phrase |

TABLE 2-continued

List of second features and corresponding criteria

| | Second Features | Pre-defined criteria |
|---|---|---|
| | 4. GN-LOT | Length of the turn divided by the max length of the turn till observed. (globally normalized) |
| | 5. GN-LOP | Length of the phrase divided by a global maximum of the length till observed. (globally normalized) |
| | 6. LN-LOP | Length of the phrase divided by the max length of the phrase observed in the same turn (locally normalized) |
| Set of conversational element | 7. TI | Turn Index (number) containing the phrase in the chat |
| | 8. TB | Time from the beginning of the chat to the turn containing the phrase |
| | 9. TP | Time from the previous turn to the turn containing the phrase. |
| | 10. IA | Is it an agent's turn 0 or 1 - yes or no |
| | 11. PP | Position of the phrase in the turn (start index) |
| | 12. IQ | Is the turn a question 0 or 1 - yes or no |

At step 310, the summary content of the real-time conversation is generated based on at least the extracted one or more second features and the one or more annotations associated with the determined one or more first features. In an embodiment, the processor 202 may be configured to generate the summary content of the real-time conversation based on at least the extracted one or more second features and the one or more annotations associated with the determined one or more first features. In an embodiment, the processor 202 may utilize the one or more trained classifiers to generate the summary content of the real-time conversation.

Prior to the generation of the summary content, the training unit 214, in conjunction with the processor 202, may be configured to train the one or more classifiers. For training the one or more classifiers, the processor 202 may be configured to extract the one or more historical conversations from the database server 108. Thereafter, the processor 202 may be configured to determine one or more historical first features from each of the one or more historical conversations based on the one or more pre-defined POS patterns. The extracted one or more historical first features are then manually annotated as "1" (i.e., summary phrases) or "0" (i.e., non-summary phrases) to obtain the one or more annotations of the extracted one or more historical first features. Thereafter, the processor 202 may be configured to extract one or more historical second features from the extracted one or more historical first features. Thereafter, the training unit 214 may use the extracted one or more historical second features and the one or more annotations of the extracted one or more historical first features to train the one or more classifiers. In an embodiment, the training unit 214 may train the one or more classifiers to classify the problem type and the resolution type, and predict the summary phrases of the real-time conversation by using the extracted one or more historical second features and the one or more annotations of the extracted one or more historical first features.

In another embodiment, the processor 202, in conjunction with the training unit 214, may be configured to determine the granularity of the one or more historical conversations for training the one or more classifiers. The determination of the is based on a condition that whether the generation of the summary content is required to be triggered at every turn or at every segment in the real-time conversation. In case, the higher granularity in the generation of the summary content is required the segmentation unit 202a may be configured to perform segmentation of the one or more historical conversations. Further, the segments of the whole historical conversation may be considered as training data instances. In another case, when the higher granularity in the generation of the summary content is not required each turn in the historical conversation may be considered as the training data instance. Thereafter, the training unit 214 may utilize the training data instances to train the one or more classifiers.

In an embodiment, the processor 202 may be further configured to perform a rule-based device entity extraction to determine a device (i.e., one or more products and/or services of interest) mentioned in the real-time conversation. Thereafter, the prediction/extraction unit 216, in conjunction with the processor 202, may utilize the one or more trained classifiers to generate the summary content of the real-time conversation. The generation of the summary content of the real-time conversation has been further explained in detail in FIG. 4.

The generated summary content of the real-time conversation may include one or more sections. The one or more sections may comprise at least an abstract section and an excerpt section. The abstract section may comprise information that is indicative of at least one of a current state or status of the real-time conversation, the one or more products and/or services of interest indicated in the real-time conversation, the one or more queries (i.e., problem type) associated with the one or more products and/or services, and a solution (i.e., resolution type) pertaining to the one or more queries in the real-time conversation. The excerpt section may comprise the one or more key phrases that are representative of the one or more queries, requests, or complaints and the corresponding solutions in the real-time conversation. Further, the one or more key phrases in the excerpt section are supportive of the information in the abstract section of the summary content. After the generation of the summary content, the processor 202 may further be configured to store the generated summary content in the storage device, such as the memory 206 and/or the database server 108.

At step 312, the user interface is generated to render the summary content of the real-time conversation between the customer and the first agent. In an embodiment, the graphical processor 204 may be configured to generate the user interface for rendering the summary content of the real-time conversation between the customer and the first agent. The generated user interface may be displayed on the plurality of computing devices. For example, the graphical processor 204 may be configured to render the generated summary content on the user interface displayed on a display screen of an agent-computing device, such as the first agent-computing device 104A, associated with the customer care agent who is in the real-time conversation with the customer. In another exemplary scenario, the graphical processor 204 may be configured to render the generated summary content on the user interface displayed on a display screen of the customer-computing device 102, over the communication network 110. Various user interfaces displaying the updated summary content, that is generated corresponding to the ongoing real-time conversation, has been explained later in FIGS. 5A-5D.

At step 314, the generated user interface is transmitted to at least one of the plurality of computing devices. In an embodiment, the processor 202, in conjunction with the transceiver 210, may transmit the generated user interface to at least one of the plurality of computing devices, over the communication network 110. In an embodiment, the processor 202, in conjunction with the transceiver 210, may transmit the generated user interface to the second agent-computing device 104B associated with the second agent. In such a case, the user interface rendering the generated summary content of the real-time conversation between the customer and the first agent may be displayed on the display screen of the second agent-computing device 104B. The second agent, associated with the second agent-computing device 104B, may utilize the rendered generated summary content to supervise one or more skills of the first agent. For example, the second agent may be a supervisor or a manager, who may monitor one or more performance skills, such as problem solving skills or communication skills, of the first agent based on the rendered generated summary content. In a scenario, where the second agent determines that the first agent may not be able to provide an appropriate solution to the customer, the second agent may utilize the second agent-computing device 104B to take over the real-time conversation with the customer, over the communication network 110.

In an embodiment, the processor 202, in conjunction with the transceiver 210, may transmit the generated user interface to the third agent-computing device 104C, associated with the third agent, when the third agent is in communication with the customer. In such a case, the user interface rendering the generated summary content of the real-time conversation between the customer and the first agent may be displayed on a display screen of the third agent-computing device 104C. In an instance, the third agent may replace the first agent in the real-time conversation with the customer, when the real-time conversation occurring between the customer and the first agent is intentionally transferred to the third agent, either by the first agent or the second agent. In another instance, the third agent may replace the first agent in the next real-time conversation with the customer, when the current real-time conversation occurring between the customer and the first agent is disconnected due to network issues, such as congestion or limited bandwidth, over the communication network 110. Both of the above-mentioned instances may correspond to the hand-off of the current real-time conversation to the third agent.

Post the hand-off, the third agent is unaware of the conversation that may have happened between the customer and the first agent in the previous real-time conversation. In such a case, the third agent may request the customer to re-state the one or more queries, requests, or complaints that was communicated earlier to the first agent. However, this whole process may consume more time (of both the third agent and the customer) and the customer may not be happy with the customer care service. In such a scenario, the third agent may utilize the third agent-computing device 104C to request for the summary content of the previous real-time conversation between the customer and the first agent.

In case of such hand-offs, in response to a request raised by the third agent, the user interface (rendering the generated summary content of the real-time conversation between the customer and the first agent) may be displayed on the display screen of the third agent-computing device 104C. The third agent may utilize the rendered generated summary content to determine the one or one or more queries, request, or complaints of the customer. Based on the determined one or more queries, request, or complaints of the customer, the third agent may provide the responses or solutions to the customer. Based on the current real-time conversation between the customer and the third agent, the processor 202 may further update the generated summary content rendered by the user interface displayed on the display screen of the third agent-computing device 104C. The processor 202 may further store the updated generated summary content in the storage device, such as the memory 206 and/or the database server 108. Control passes to end step 316.

Figure 4:
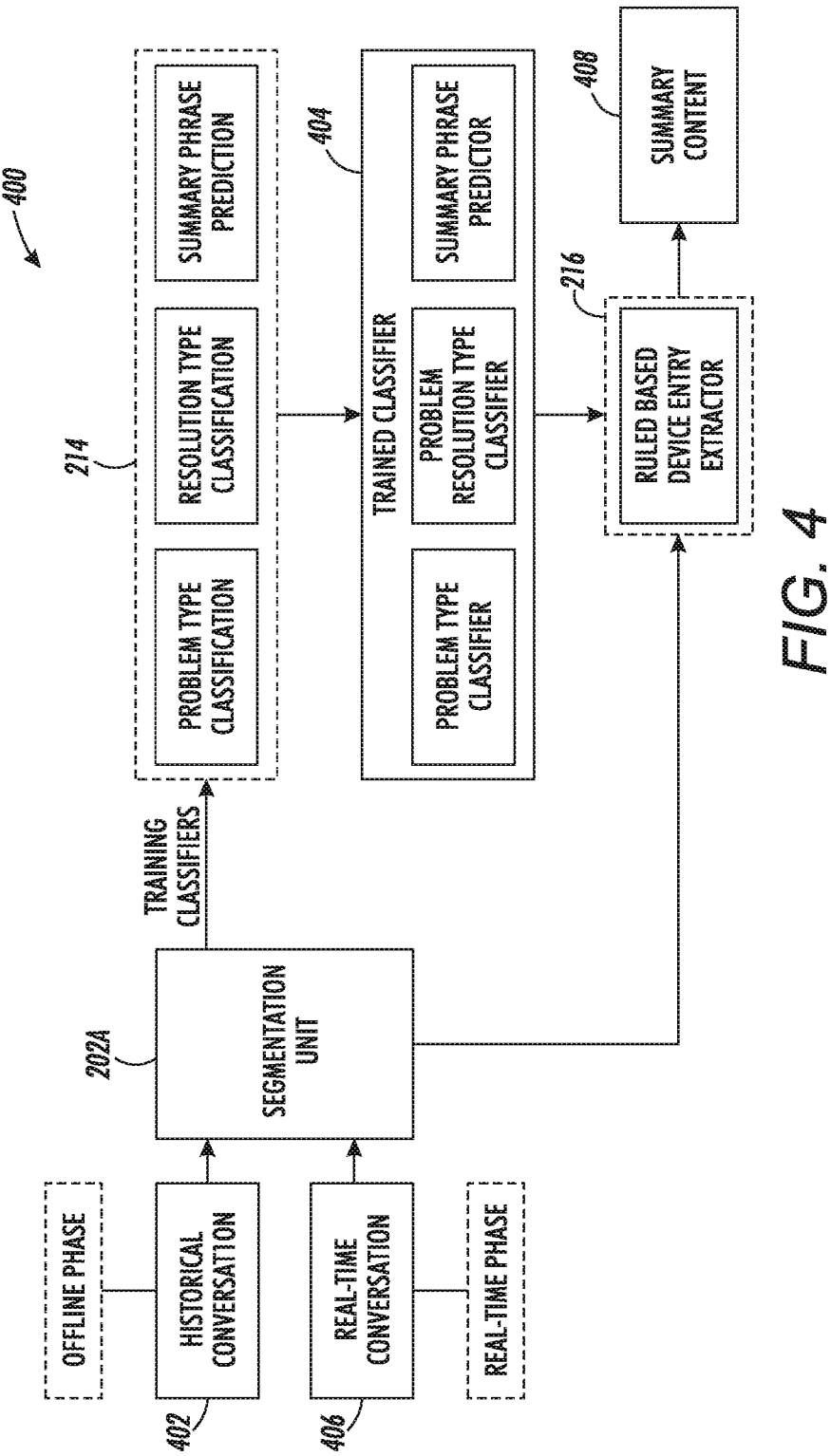
FIG. 4 is a block diagram that illustrates a flow diagram for a summary generation of a real-time conversation, in accordance with at least one embodiment.

FIG. 4 is a block diagram that illustrates a flow diagram for summary generation of a real-time conversation, in accordance with at least an embodiment. FIG. 4 is described in conjunction with elements from FIG. 1, FIG. 2, and FIG. 3. With reference to FIG. 4, there is shown a block diagram 400 that includes a historical conversation 402, the segmentation unit 202a, the training unit 214, one or more classifiers and/or predictors 404, a real-time conversation 406, the prediction/extraction unit 216, and a summary content 408.

The block diagram 400 is explained in two phases, such as an offline phase and a real-time phase. In the offline phase, the training unit 214 may be configured to train the one or more classifiers and/or predictors 404, based on the one or more historical conversations, such as the historical conversation 402. Thus, the processor 202 may be configured to extract the one or more historical conversations, such as the historical conversation 402, from the database server 108.

Before training the one or more classifiers, the training unit 214 may determine whether the generation of the summary content is required to be triggered at every turn or at every segment in the conversation. In an embodiment, the triggering of the generation of the summary content is based on the required granularity as specified in the request. In case, the summary content is required to be generated at every segment the segmentation unit 202a may be configured to segment the one or more historical conversations, such that the generated segments correspond to the training data instance. Otherwise, each turn in the historical conversation 402 may correspond to the training data instance and the summary content may be generated at each turn. Thereafter, the training unit 214 may be configured to train the one or more classifiers and/or predictors 404 based on the training data instances.

For the training of the one or more classifiers and/or predictors 404, the processor 202 may be configured to determine the one or more historical first features from each of the one or more historical conversations based on the one or more pre-defined POS patterns. The extracted one or more historical first features are then manually annotated as "1" (i.e., summary phrases) or "0" (i.e., non-summary phrases) to obtain the one or more annotations of the extracted one or more historical first features. Thereafter, the processor 202 may be configured to extract the one or more historical second features from the extracted one or more historical first features.

Thereafter, the training unit 214 may be configured to train the one or more classifiers (such as "Problem Type Classifier" and "Resolution Type Classifier") and/or predictors (such as "Summary Phrase Predictor") 404 based on the extracted one or more historical second features and the one or more annotations of the extracted one or more historical first features. In an embodiment, the one or more classifiers and/or predictors 404 are trained based on classification of problem type indicated by "Problem Type Classification," a classification of resolution type indicated by "Resolution Type Classification," and a prediction of summary phrase indicated by "Summary Phrase Prediction" in FIG. 4.

In real-time phase, the processor 202, in conjunction with the prediction/extraction unit 216, utilizes the one or more trained classifiers (such as the "Problem Type Classifier," "Resolution Type Classifier") and/or predictors (such as "Summary Phrase Predictor") 404 to predict the problem type, the resolution type, and the summary phrases from the real-time conversation 406. The prediction of the problem type, the resolution type, and the summary phrases from the real-time conversation 406 may be based on summary update granularity (segment-based or turn-based) of the real-time conversation 406. The processor 202 may be further configured to perform rule-based extraction of the one or more products and/services, such as the device entity, from the real-time conversation 406.

For such rule-based extraction of the one or more products and/services, the processor 202 may be configured to extract unigrams from a default dictionary of various products and/or services. The unigrams may be n-grams, which are contiguous sequence of n-items from keywords in the real-time conversation 406. The n-items may be phonemes, syllables, letters, words, and/or base pairs. The processor 202 may be further configured to determine term frequency and inverse document frequency (TF and IDF) values of the unigrams based on the real-time conversation 406 and the historical conversation 402. In an embodiment, the products and/or services may be discussed in initial turns of the real-time conversation 406, thus the processor 202 may be configured to determine the unigrams with best values within a threshold confidence level, based on the expression, "(turn_number)/(TF*IDF+1)." The processor 202 may be further configured to match the products and/or services in an actual dictionary with the determined unigrams. The matching may correspond to a weighted frequency match. The unigrams containing digits may be given half weightage as compared to the unigrams containing due to greater likelihood of indicating type, such as model type, of a product, such as a device, in the real-time conversation 406. Thus, products and/or services with maximum number of unigram matches may be extracted. Further the processor 202 may be configured to order the unigrams (determined with the best values) based on their average positions in the extracted products and/or services. Thus, the processor 202 may be configured to determine the best unigrams and the best ordering, based on which a product and/or service may be ascertained on which the real-time conversation 406 is based.

Accordingly, the processor 202 may generate the summary content 408 of the real-time conversation 406 occurring between the customer and the customer care agent, based on the predicted problem type, the resolution type, the summary phrases, and the ascertained product and/or service. The graphical processor 204 may generate the user interface that may render the generated summary content 408. The user interface may be displayed on the plurality of computing devices, such as the customer-computing device 102, the second agent-computing device 104B, and/or the third agent-computing device 104C.

FIGS. 5A-5D are block diagrams that illustrate exemplary scenarios for a summary generation of a real-time conversation, in accordance with an embodiment. FIGS. 5A-5D are described in conjunction with elements from FIGS. 1-4. With reference to FIGS. 5A-5D, there are shown user interfaces 500A-500D, respectively. In each of the user interfaces 500A-500D, there is shown an ongoing chat section 502, and a summary section 504. The ongoing chat section 502 comprises a transcript of an ongoing real-time conversation, such as a support session. The summary section 504 comprises the generated summary of the support session in real-time. The summary section 504 includes an abstract section 506A and an excerpt section 506B. The abstract section 506A may further include one or more sections that are representative of a status of the ongoing support session, a predicted product and/or service, such as a mobile device, for which the support session is initiated, a predicted problem related to the product and/or service, and a predicted resolution for the problem.

Figure 5A:
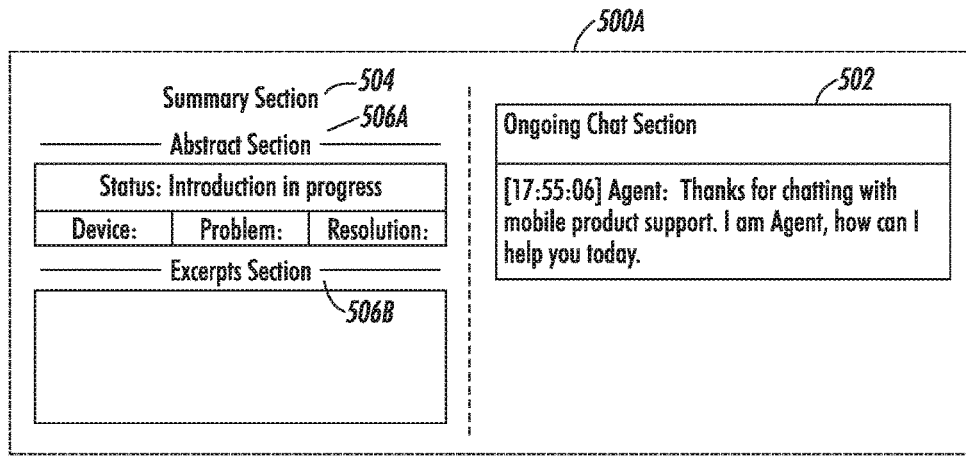
FIGS. 5A-5D illustrate graphical user interfaces (GUIs) that depict an exemplary scenario for a summary generation of a real-time conversation, in accordance with at least one embodiment.

With reference to FIG. 5A, there is shown the user interface 500A, displayed on a display screen of an agent-computing device, such as the first agent-computing device 104A. The user interface 500A may correspond to a first state of support session between the customer and the customer care agent, once the support session is initiated by the customer with the first agent, via a chat. The first state of support session may correspond to an introduction phase wherein the customer and the customer care agent introduce themselves to each other. As observed from the ongoing chat section 502 displayed in the user interface 500A, the first agent responds as "Thanks for chatting with mobile product support. I am Agent, how can I help you today." The status is accordingly updated as "Introduction in progress" in the abstract section 506A of the summary section 504.

Figure 5B:
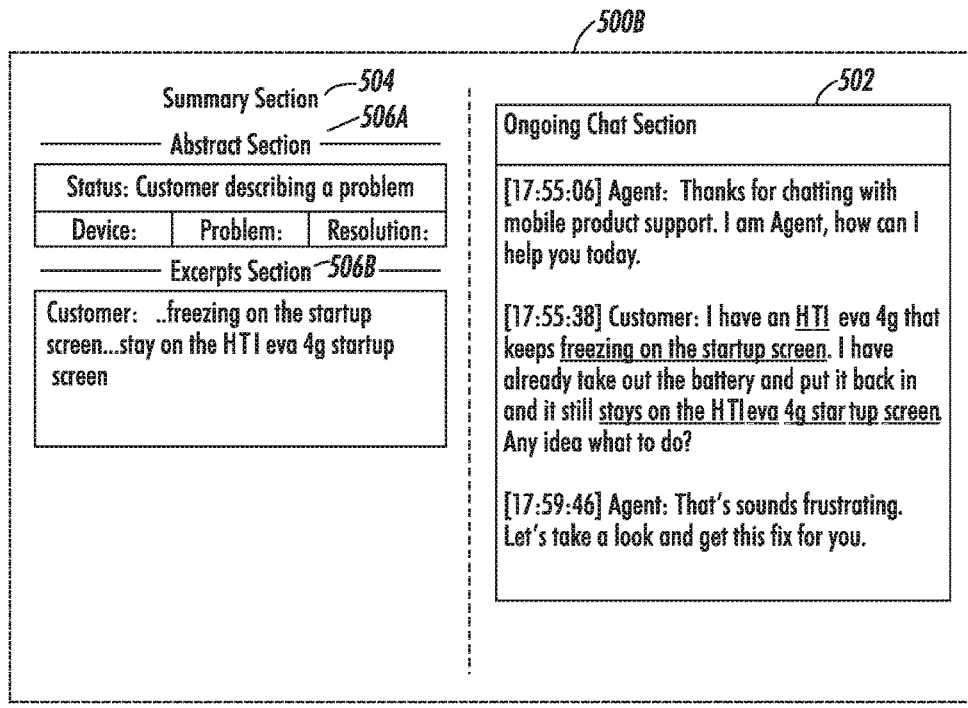

With reference to FIG. 5B, there is shown a user interface 500B, displayed on the display screen of the first agent-computing device 104A. The user interface 500B may correspond to a second state of the support session, once the customer and the customer care agent are introduced to each other. The first state of support session may correspond to a phase wherein the customer explains a problem statement. For example, as displayed on the user interface 500B in the ongoing chat section 502, the customer describes the problem statement, associated with a product and/or service, to the first agent. For example, the customer states "I have an HTI eva 4g that keeps freezing on the startup screen. I have already taken out the battery and put it back in and it still stays on the HTI eva 4g startup screen. Any idea what to do?" Based on at least the problem statement stated by the customer, the status is accordingly updated as "Customer describing a problem" in the abstract section 506A of the summary section 504. Thereafter, the prediction/extraction unit 216 may predict summary phrases based on the problem stated by the customer. With respect to the ongoing example, the prediction/extraction unit 216 predicts "freezing on the startup screen" and "stay on the HTI eva 4g startup screen" as summary phrases in the problem statement of the customer. Based on at least the prediction, the processor 202 may update the excerpt section 506B as "Customer: . . . freezing on the startup screen . . . stay on the HTI eva 4g startup screen."

Figure 5C:
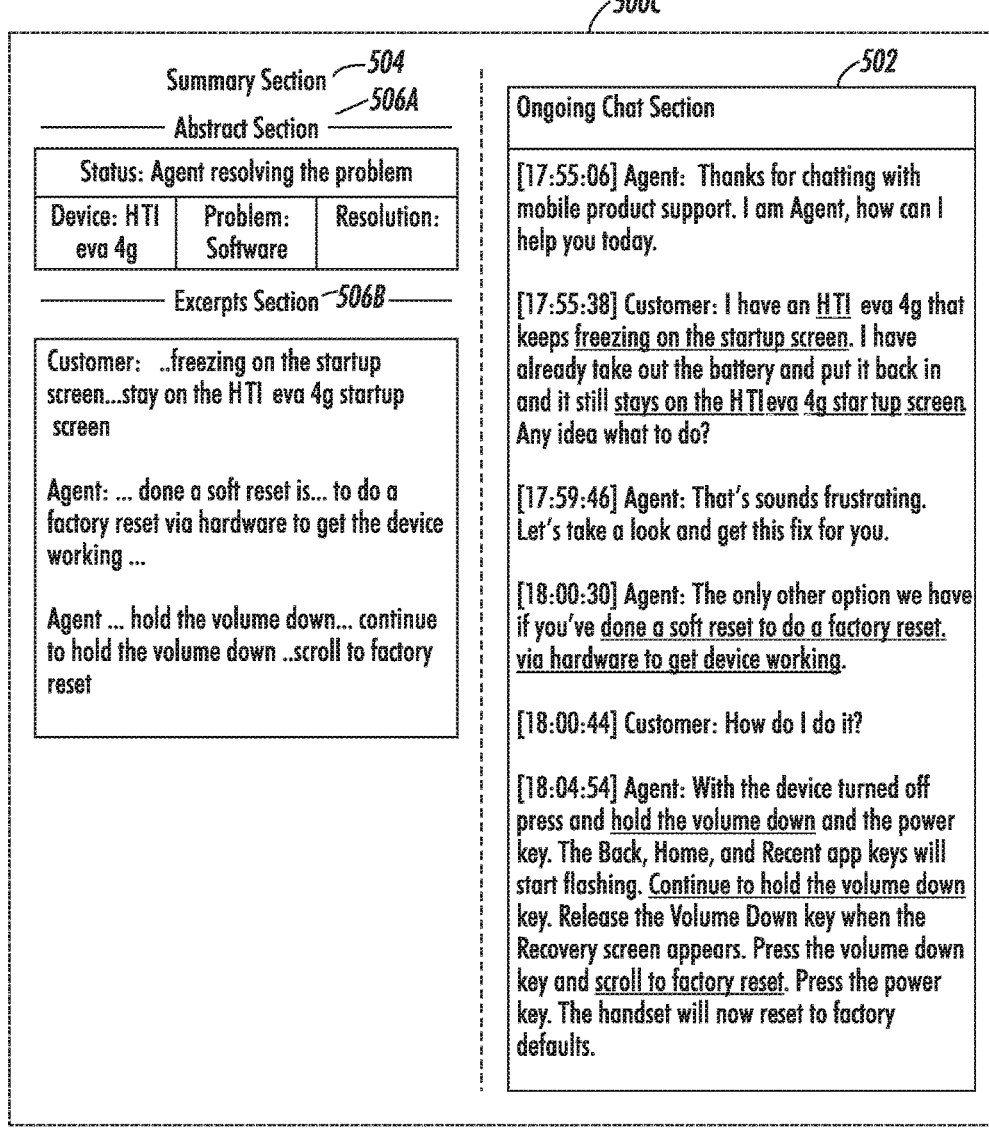

With reference to FIG. 5C, there is shown a user interface 500C, displayed on the display screen of the first agent-computing device 104A. The user interface 500C may correspond to a third state of the support session, once the customer has stated the problem. The third state of the support session may correspond to a phase wherein the first agent resolves the problem. For example, as displayed on the user interface 500C in the ongoing chat section 502, the first agent explains one or more resolutions in response to the problem statement stated by the customer. For example, the first agent states "the only other option we have if you've done a soft reset to do a factory reset, Via hardware to get device working." Based on at least the one or more resolution statements stated by the first agent, the status is updated accordingly as "Agent resolving the problem" in the abstract section 506A of the summary section 504. Thereafter, the prediction/extraction unit 216 may predict summary phrases based on the one or more resolution statements stated by the first agent. With respect to the ongoing example, the prediction/extraction unit 216 predicts "done a soft reset" and "to do a factory reset, via hardware to get device working" as summary phrases from the one or more resolution statements of the first agent. Based on at least the prediction, the processor 202 may update the excerpt section 506B as "Agent: . . . done a soft reset is . . . to do a factory reset via hardware to get the device working . . . ".

Further, in an embodiment, based on at least one of the problem statements and the one or more resolution statements, the prediction/extraction unit 216 predicts the product as the device "hti eva" (based on rule-based extraction of one or more products and/services) and the problem type as "software" in the abstract section 506A of the summary section 504. Similarly, the processor 202 may be configured to update the summary section 504 based on next parts of the support session.

Figure 5D:
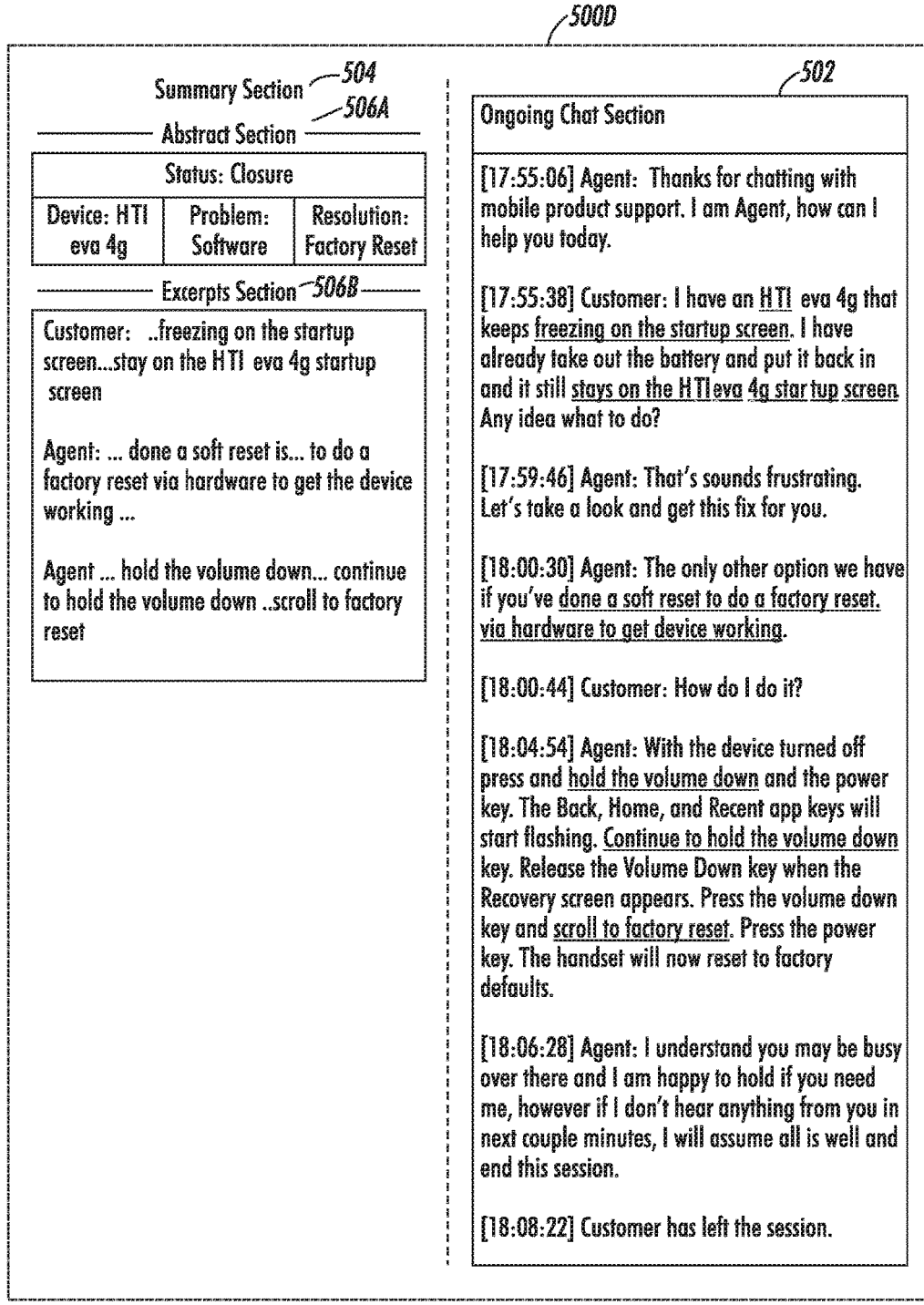

With reference to FIG. 5D, there is shown a user interface 500D, displayed on the display screen of the first agent-computing device 104A. The user interface 500C may correspond to a fourth state of the support session, once the agent has provided resolution of the problem. The fourth state of the support session may correspond to a final phase wherein the support session is closed. For example, as displayed on the user interface 500D in the ongoing chat section 502, after explaining the one or more resolutions in response to the problem statement, the agent may wait for a reply from the customer for a threshold time, such as two minutes. After the threshold time, the first agent may indicate for closure of the support session. For example, after explaining the one or more solutions to the customer, the agent may state "I understand you may be busy over there and I am happy to hold if you need me, however, if I don't hear anything from you in the next couple of minutes I will assume all is well and end this session." The first agent may end the session after two minutes or after the customer has end the session. Based on the statement of the first agent, the status may be accordingly updated as "Closure" in the abstract section 506A of the summary section 504. The processor 202 may update the summary section 504 accordingly at the end of the support session based on summary phrases predicted by the prediction/extraction unit 216. The prediction/extraction unit 216 may further predict the resolution as "Factory Reset" in the abstract section 506A of the summary section 504. The processor 202 may be further configured to store the updated summary section 504 in the memory 206 and/or in the database server 108.

The disclosed embodiments encompass numerous advantages. The disclosure provides a method for a summary generation of a real-time conversation in a customer care environment. The disclosed method helps to reduce the time taken by a supervisor to monitor one or more skills of one or more customer care agents by automated generation of summary content of a real-time conversation in the customer care environment. The disclosed method further reduces the delay time in attaining the one or more customers in one or more real-time conversations. The disclosed method further provides an easy solution to deal with one or more customer's queries by generating the summary content. The summary content may provide necessary information about a state of the real-time conversation between the one or more customer care agents and the one or more customers. The summary content may be quite helpful in supporting a human supervisor (i.e., a customer care agent) to monitor the conversation between the customer and an automated bot device.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for real-time summary generation of a real-time conversation have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for summary generation of a real-time conversation, said method comprising:
   receiving, by one or more transceivers at a server, said real-time conversation from a plurality of computing devices over a communication network, wherein said plurality of computing devices is associated with at least a first user and a second user;
   determining, by one or more processors at the server, one or more first features of said real-time conversation between at least said first user and said second user based on at least one or more pre-defined part of speech (POS) patterns;
   extracting, by said one or more processors, one or more second features from said one or more first features based on one or more pre-defined criteria wherein the one or more second features comprise a set of words, a set of contextual information, and a set of conversational elements that are extracted by the one or more POS patterns, and wherein the one or more pre-defined criteria comprise a length of a phrase containing the set of words, a length of a turn containing the phrase, and the length of the turn divided by a global maximum length of turns within the real-time conversation;
   generating, by said one or more processors, a summary content of said real-time conversation based on at least said extracted one or more second features and one or more annotations associated with said determined one or more first features by use of one or more trained classifiers; and
   rendering, by one or more graphical processors, said generated summary content on a user interface displayed on at least one of said plurality of computing devices.

2. The method of claim 1, wherein said real-time conversation corresponds to a communication between at least said first user and said second user, wherein said first user initiates said communication with said second user over said communication network, or vice-versa, wherein said second user corresponds to a human agent or a bot device.

3. The method of claim 1, wherein said generated summary content includes one or more sections, wherein said one or more sections comprises at least an abstract section and an excerpt section.

4. The method of claim 3, wherein said abstract section comprises information that is indicative of at least one of: a current state of said real-time conversation, a product/service of interest indicated in said real-time conversation, a query associated with said product/service, and a solution pertaining to said query in said real-time conversation.

5. The method of claim 3, wherein said excerpt section comprises one or more key phrases that are representative of said real-time conversation and supportive of information in said abstract section.

6. The method of claim 5 further comprising rendering, by said one or more graphical processors, said generated summary content of said real-time conversation at said user interface displayed on a display screen of a computing device associated with a third user, wherein said generated summary content is utilized by said third user to monitor one or more skills of at least said second user.

7. The method of claim 5 further comprising rendering, by said one or more graphical processors, said generated summary content of said real-time conversation at said user interface displayed on a display screen of a computing device of a fourth user, when said fourth user is in another real-time conversation with said first user.

8. The method of claim 7, wherein said another real-time conversation between said first user and said fourth user is initiated over said communication network, when said real-time conversation between said first user and said second user is terminated over said communication network or said real-time conversation between said first user and said second user is transferred to said fourth user by said second user or said third user.

9. The method of claim 1 further comprising training, by said one or more processors, one or more classifiers based on at least one or more historical conversations.

10. A system for summary generation of a real-time conversation, said system comprising:
   one or more transceivers configured to:
   receive said real-time conversation from a plurality of computing devices over a communication network, wherein said plurality of computing devices is associated with at least a first user and a second user;
   one or more processors configured to:
   determine one or more first features of said real-time conversation between at least said first user and said second user based on at least one or more pre-defined part of speech (POS) patterns;

extract one or more second features from said one or more first features based on one or more pre-defined criteria wherein the one or more second features comprise a set of words, a set of contextual information, and a set of conversational elements that are extracted by the one or more POS patterns, and wherein the one or more pre-defined criteria comprise a length of a phrase containing the set of words, a length of a turn containing the phrase, and the length of the turn divided by a global maximum length of turns within the real-time conversation;

generate a summary content of said real-time conversation based on at least said extracted one or more second features and one or more annotations associated with said determined one or more first features by use of one or more trained classifiers; and one or more graphical processors configured to:

render said generated summary content on a user interface displayed on at least one of said plurality of computing devices.

11. The system of claim 10, wherein said real-time conversation corresponds to a communication between at least said first user and said second user, wherein said first user initiates said communication with said second user over said communication network, or vice-versa, wherein said second user corresponds to a human agent or a bot device.

12. The system of claim 10, wherein said generated summary content includes one or more sections, wherein said one or more sections comprises at least an abstract section and an excerpt section.

13. The system of claim 12, wherein said abstract section comprises information that is indicative of at least one of: a current state of said real-time conversation, a product/service of interest indicated in said real-time conversation, a query associated with said product/service, and a solution pertaining to said query in said real-time conversation.

14. The system of claim 12, wherein said excerpt section comprises one or more key phrases that are representative of said real-time conversation and supportive of information in said abstract section.

15. The system of claim 14, wherein said one or more graphical processors are further configured to render said generated summary content of said real-time conversation at said user interface displayed on a display screen of a computing device associated with a third user, wherein said generated summary content is utilized by said third user to monitor one or more skills of at least said second user.

16. The system of claim 14, wherein said one or more graphical processors are further configured to render said generated summary content of said real-time conversation at said user interface displayed on a display screen of a computing device of a fourth user, when said fourth user is in another real-time conversation with said first user.

17. The system of claim 16, wherein said another real-time conversation between said first user and said fourth user is initiated over said communication network, when said real-time conversation between said first user and said second user is terminated over said communication network or said real-time conversation between said first user and said second user is transferred to said fourth user by said second user or said third user.

18. A computer program product for use with a computer, said computer program product comprising a non-transitory computer readable medium, wherein the non-transitory computer readable medium stores a computer program code for summary generation of a real-time conversation, wherein the computer program code is executable by one or more processors in a server to:

receive said real-time conversation from a plurality of computing devices over a communication network, wherein said plurality of computing devices is associated with at least a first user and a second user;

determine one or more first features of said real-time conversation between at least said first user and said second user based on at least one or more pre-defined part of speech (POS) patterns;

extract one or more second features from said one or more first features based on one or more pre-defined criteria wherein the one or more second features comprise a set of words, a set of contextual information, and a set of conversational elements that are extracted by the one or more POS patterns, and wherein the one or more pre-defined criteria comprise a length of a phrase containing the set of words, a length of a turn containing the phrase, and the length of the turn divided by a global maximum length of turns within the real-time conversation;

generate a summary content of said real-time conversation based on at least said extracted one or more second features and one or more annotations associated with said determined one or more first features by use of one or more trained classifiers; and render said generated summary content on a user interface displayed on at least one of said plurality of computing devices.

* * * * *